United States Patent
Hubbell, Jr.

(10) Patent No.: US 6,321,180 B1
(45) Date of Patent: Nov. 20, 2001

(54) METHOD FOR CHARACTERIZING NOISE LEVEL OF ROTATING TIRE

(75) Inventor: David Ray Hubbell, Jr., Hartville, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/308,974

(22) PCT Filed: Dec. 11, 1996

(86) PCT No.: PCT/US96/19817

§ 371 Date: May 27, 1999

§ 102(e) Date: May 27, 1999

(87) PCT Pub. No.: WO98/25775

PCT Pub. Date: Jun. 18, 1998

(51) Int. Cl.⁷ .................................................. H04B 15/00
(52) U.S. Cl. ............................................. 702/191; 73/146
(58) Field of Search ................................... 702/190, 191, 702/35, 36, 39, 58, 59, 108, 109, 111; 73/146; 181/125

(56) References Cited

U.S. PATENT DOCUMENTS

| | | | |
|---|---|---|---|
| 4,788,651 | * 11/1988 | Parker et al. | 364/574 |
| 5,269,357 | 12/1993 | Killian | 152/209 |
| 5,295,087 | * 3/1994 | Yoshida et al. | 364/578 |
| 6,112,167 | 8/2000 | Zakelj | 702/191 |

FOREIGN PATENT DOCUMENTS

| | | | |
|---|---|---|---|
| 0329927 | * 8/1989 | (EP) | B60C/11/00 |
| 0480425 | * 4/1992 | (EP) | B60C/11/00 |

* cited by examiner

Primary Examiner—Marc S. Hoff
Assistant Examiner—Edward Raymond
(74) Attorney, Agent, or Firm—Howard M. Cohn

(57) ABSTRACT

A method for characterizing the level of noise generated by a tire having a specific footprint configuration through analyzing the shape of the tire's footprint and taking into account the tire's aspect ratio. The method includes: a) measuring the noise level if the solution to the calculation is inside of a predetermined range; or b) reconfiguring the footprint if the solution to the calculation is outside of a predetermined range. The advantage of this method is that a tire designer can design a tire, taking into account the noise level.

6 Claims, 2 Drawing Sheets

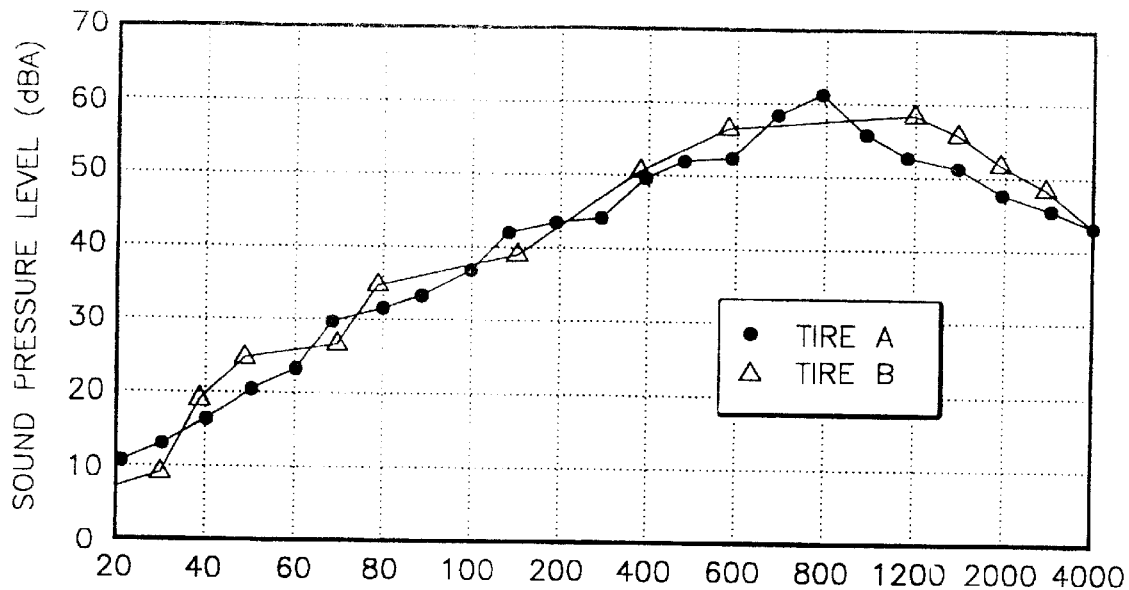
Fig.3
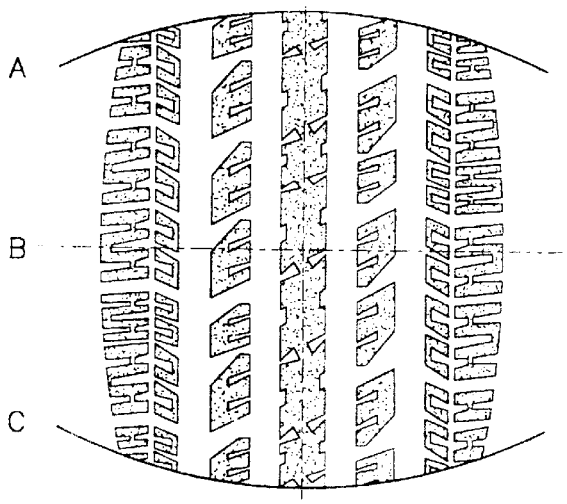
Fig.4 TIRE A
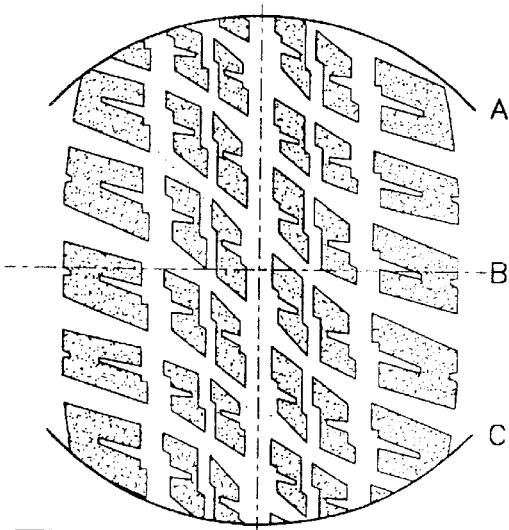
Fig.5 TIRE B
TIRE C
Fig.6
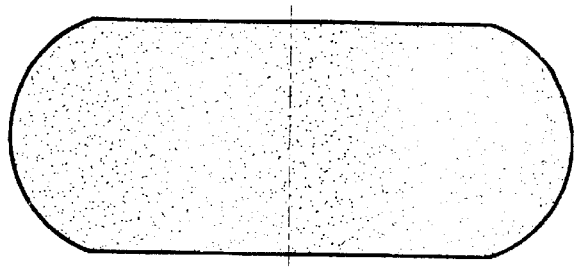
TIRE D
Fig.7

METHOD FOR CHARACTERIZING NOISE LEVEL OF ROTATING TIRE

TECHNICAL FIELD

This invention relates to the method of characterizing the level of noise generated by a tire. More particularly, the present invention relates to a method of using a footprint shape factor (FSF) calculation to characterize the noise generated by a tire tread contacting a road surface.

BACKGROUND ART

A tire manufacturer seeks to design a tire tread which not only fulfills its function relating to wear, wet and dry traction, rolling resistance, and other desirable properties, but which also operates with a acceptably low noise level. Preferably, the tire should run at an acceptable noise level through the entire operating range of a particular vehicle on which the tire is to be mounted. It is therefore necessary to evaluate a tire for noise acceptability. Historically, this has been done by hand cutting a set of tires or building a mold to produce a set of experimental tires for evaluation. These tires are normally loaded and normally inflated and then run against a surface at a predetermined speed during which time the tire noise is measured. This process is expensive and time consuming, thus limiting the number of trials available to the design engineer to optimize the tire design.

A number of methods for predicting the noise level of a specific tire design have been developed for a running tire. For example, U.S. Pat. Nos. 4,788,651 and 5,295,087 relate to methods of simulating noise generated by a tire with a computer. However, none of the conventional noise simulators take into account the effect of the aspect ratio of the tire in analyzing the construction of a tire with regards to the level of noise it generates.

OBJECTS AND SUMMARY OF THE INVENTION

It is an object of the present invention to provide a method of characterizing the level of noise generated by a tire having a specific footprint configuration to obviate the problems and limitations of the prior art methods.

It is another object of the present invention to provide a method of characterizing the level of noise generated by a tire through analyzing the shape of the tires footprint and taking into account the aspect ratio of the tire.

Another object of the invention is to provide a method of characterizing the level of noise generated by a tire with a calculation that accounts for the aspect ratio of the tire and then: a) measuring the noise level if the solution to the calculation is inside of a predetermined range; or b) reconfiguring the footprint if the solution to the calculation is outside of a predetermined range.

Accordingly, there is provided a method for characterizing the potential noise level generated by a tire tread during the rotation of a tire in contact with a road surface. The method includes the steps of: a) determining the location of a leading edge of a footprint of the tire tread which first comes into contact with the road surface when the tire rotates with respect to the location of a trailing edge of the footprint that last comes into contact with the road surface when the tire rotates; b) determining the length of the footprint from the leading edge to the trailing edge extending along a centerline disposed halfway between first and second lateral edges of the tire footprint; c) determining the length of the footprint from the leading edge to the trailing edge in proximity to the first and second lateral edges of the footprint at a location corresponding to about 80% of the lateral distance from the centerline to the first and second lateral edges when the aspect ratio is more than about 60; d) determining the length of the footprint from the leading edge to the trailing edge in proximity to the second lateral edge of the footprint at a location corresponding to about 90% of the lateral distance from the centerline to the first and second lateral edges when the aspect ratio is less than about 60; e) calculating the footprint shape factor of the tire having an aspect ratio above about 60 with an equation $$FSF80\% = \frac{L}{(A_1 + A_2)/2}$$

or with an equation $$FSF90\% = \frac{L}{(B_1 + B_2)/2}$$

when the aspect ratio of the tire is below about 60; and f) measuring the noise level of the tire when either 0.9<FSF80%<1.6 or 0.9<FSF90%<2.0. In the event that the condition 0.9>FSF80%>1.6 or 0.9>FSF90%>2.0 exists, the footprint is reconfigured and steps a) though f) are rerun.

IN THE DRAWINGS

The structure, operation, and advantages of the presently preferred embodiments of the invention will become further apparent upon consideration of the following description taken in conjunction with the accompanying drawings.

FIG. 3 is a graph showing a curve plotting the relationship of noise level versus the ⅓ Octave High Frequency for two closely matched tires A and B, as shown in FIGS. 4 and 5, which were primarily dissimilar in the curvature of their footprint;

FIG. 4 is a schematic illustration of a footprint of a test tire A;

FIG. 5 is a schematic illustration of a footprint of a test tire B;

FIG. 6 is a schematic illustration of a footprint of a smooth test tire C; and

FIG. 7 is a schematic illustration of a footprint of a smooth test tire D.

DETAILED DESCRIPTION OF THE INVENTION

The invention is directed to a method for characterizing the potential noise level generated by a tire tread contacting a road surface during the rotation of the tire.

Figure 1:
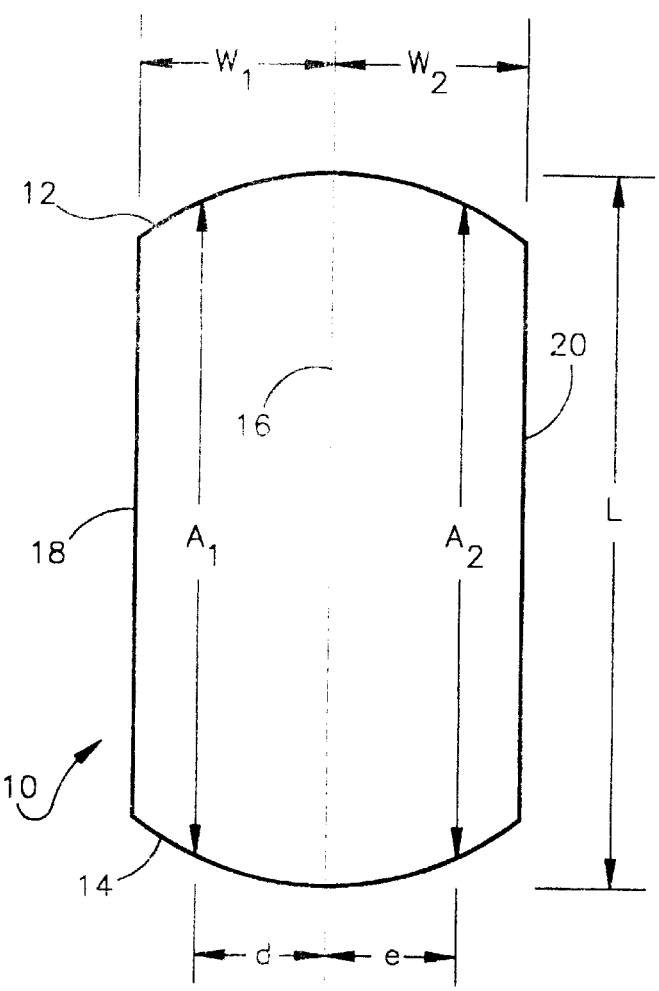
FIG. 1 is a schematic illustration of a footprint of a tire having an aspect ratio of greater than about 60.
Figure 2:
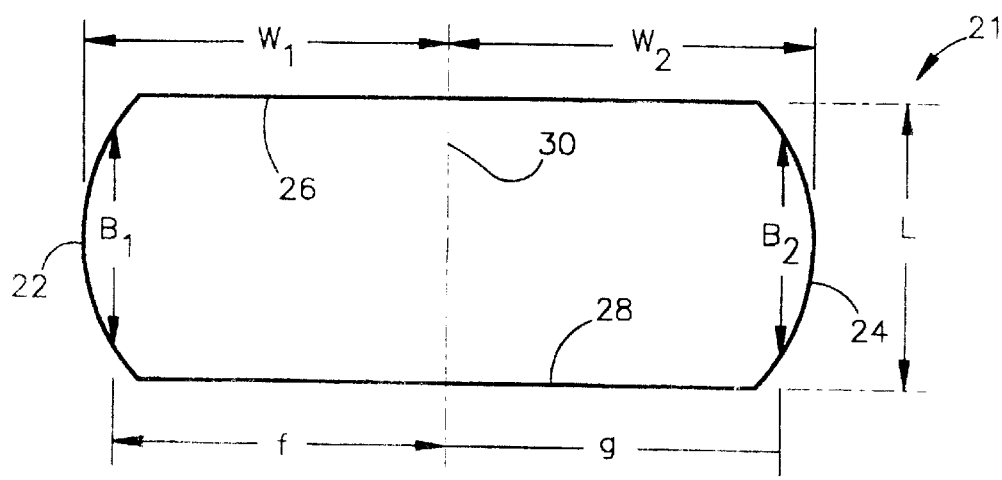
FIG. 2 is a schematic illustration of a footprint of a tire having an aspect ratio of less than about 60.

Reducing the noise level, i.e., the noise emitted by the tire while it moves on a road surface, through redesign of the contact patch or footprint of the tire tread during the rotation of the tire on the road surface. It is believed, that a tire with a relatively high aspect ratio, i.e., above about 60, has a footprint shape which is relatively straight along the first and second opposite lateral edges 18 and 20, respectively, and has curved leading and trailing edges 12 and 14, respectively, as generally shown in FIG. 1. Conversely, when the aspect ratio of the tire falls below about 60, as shown in FIG. 2, the first and second lateral edges 22 and 24 are curved and the leading and trailing edges 26 and 28 are relatively straighter. When the lateral edges are more curved, as shown in FIG. 2, there is more curvature at the shoulders of the tire while the leading and trailing edges of the footprint are relatively straight. The straighter leading and trailing edges cause everything along the front and rear of the tire to contact the road at substantially the same time. However, with the increased curvature at the lateral edges 22 and 24 of the footprint, the shoulder portions of the tire are not in contact with the road surface as long a time period as the portions of the tire located closer to the centerline 30. Therefore, the shoulder portions near the lateral edges 22 and 24 of the tire with a low aspect ratio experience more movement and twisting than the portion of the tire closer to the centerline 30. This increased movement and twisting causes a stress build-up in the shoulders that results in more wear and more noise. A footprint shape factor (FSF) calculation, which was previously used to determine a tire's wear performance capability, has been adopted in the present invention to characterize the noise level of the tire as it rotates. An important aspect of the invention resides in the distinction between the measurements of the footprint shape of a tire having an aspect ratio above about 60 as compared to the measurements of the footprint shape of a tire having an aspect ratio below about 60. The details of these differences are discussed herein after.

Typically a footprint 10 of a tire, as shown in FIG. 1, wherein the aspect ratio is above about 60, has a leading edge 12 which comes into contact with the road surface as the tire rotates. For purpose of the present invention, the tires are considered to be normally loaded, i.e., the load within the estimated operating range for the specific tire, and normally inflated, i.e., an inflation pressure within the estimated operating range for the specific tire. The trailing edge 14 of the footprint 10 is the opposite edge of the footprint that last comes into contact with the road surface when the tire rotates. The length (L) of footprint 10 extends from the leading edge 12 to the trailing edge 14 along a centerline 16 disposed substantially halfway between a first lateral edge 18, also known as the outboard edge, and a second lateral edge 20, also known as the inboard edge. Once the overall dimensions of the footprint are determined, then, depending on the aspect ratio, the footprint shape factor of the tire is calculated.

An example of characterizing the potential noise level generated during the rotation of a tire contacting a road surface with the footprint shape factor is described in conjunction with the footprint 10 illustrated in FIG. 1 where the aspect ratio is greater than 60. First, the locations of the leading edge 12, the trailing edge 14, and the first and second lateral edges 18 and 20, respectively, with respect to the centerline (CL) 16 are determined. Then, the length $A_1$ of the footprint from the leading edge 12 to the training edge 14 in proximity to first lateral edge 18 at a location "d" corresponding to about 80% of the distance ($W_1$), where $W_1$ is the lateral distance from the centerline 16 to the first lateral edge 18. Next, the length $A_2$ of the footprint from the leading edge 12 to the trailing edge 16 in proximity to the second lateral edge 20 of the footprint at a location "e" corresponding to about 80% of the distance ($W_2$), where $W_2$ is the lateral distance from centerline 16 to second lateral edge 20. Next, the footprint shape factor (FSF80%) of the tire with an aspect ratio of 60 or more is calculated with the following equation:

$$FSF80\% = \frac{L}{(A_1 + A_2)/2}$$

When FSF80% meets the following criteria 0.9<FSF80%>1.6, the noise level of the tire is measured. It is generally been found that as the FSF80% moves closer to 0.9, the noise level decreases. However, it may be desirable to keep the FSF80% value closer to 1.6 for other design considerations such as tire handling, rolling resistance, and tire wear. However, if the FSF80% is outside of the range, i.e., above 1.6 or below 0.9, the footprint is typically reconfigured and the steps of determining the FSF80% are rerun until FSF80% is within the preset range. While the upper limit for FSF80% is 1.6, a more preferred upper limit is about 1.3.

Once the footprint shape factor calculation is at a value within the preset range, the noise level emitted by a tire having the specific footprint is measured. While the noise level can be measured over the entire frequency range, it has been found that the differences in noise measured above about 800 hertz (Hz) are the best indicator of how changes in the tire construction and specifically the footprint shape effect the noise emitted from the tire.

With a tire having an aspect ratio of less than about 60, as shown in FIG. 2, the footprint 21 has a greater curvature at the first and second edges 22 and 24 and straighter leading and trailing edges 26 and 28. The result is that the shoulders of the tire flex more during the rotation of the tire as compared with a tire having an aspect ratio above 60, as shown in FIG. 1.

Typically a footprint 21 of a tire, as shown in FIG. 2, wherein the aspect ratio is below about 60, has a leading edge 26 which comes into contact with the road surface as the tire rotates. For purpose of the present invention, the test tires discussed throughout the present specification are considered to be normally loaded and normally inflated as discussed before. The trailing edge 28 of the footprint 21 is the opposite edge of the footprint that last comes into contact with the road surface when the tire rotates. The length (L) of footprint 21 extends from the leading edge 26 to the trailing edge 28 along a centerline 30 disposed halfway between a first lateral edge 22, also known as the outboard edge, and a second lateral edge 24, also known as the inboard edge. Once the overall dimensions of the footprint 21 are determined, the footprint shape factor of the tire is calculated.

An example of characterizing the potential noise level generated during the rotation of a tire with an aspect ratio of less than about 60 is accomplished with the footprint shape factor in conjunction with the footprint 21 illustrated in FIG. 2. First, the location of the leading edge 26, the trailing edge 28, and the first and second lateral edges 22 and 24, respectively, with respect to the centerline 30 are determined. Then, the length $B_1$ of the footprint from the leading edge 26 to the trailing edge 28 in proximity to first lateral edge 22 at a location "f" corresponding to about 90% of the distance ($W_1$), where $W_1$ is the lateral distance from the centerline 30 to the first lateral edge 22 is determined. Next, the length $B_2$ of the footprint 21 from the leading edge 26 to the trailing edge 28 in proximity to the second lateral edge 24 of the footprint at a location "g" corresponding to about 90% of the distance ($W_2$), where $W_2$ is the lateral distance from centerline 30 to second lateral edge 24 is determined. Then, the footprint shape factor (FSF90%) of the tire with an aspect ratio of 60 or less is calculated with the following equation:

$$FSF90\% = \frac{L}{(B_1 + B_2)/2}$$

When FSF90% meets the following criteria 0.9<FSF90%<2.0, the noise level of the tire is measured. It has generally been found that as the FSF90% moves closer to 0.9, the noise level decreases. However, it may be desirable to keep the FSF90% closer to 2.0 for other design considerations such as tire handling, rolling resistance, and tire wear. Moreover, if the FSF90% is outside of the range, i.e., above 2.0 or below 0.9, the footprint 21 is typically reconfigured and the steps of determining the FSF90% are rerun until FSF90% is within the preset range. While a broad range for FSF90% has been set out, a more preferred range is about 1.0<FSF90%<1.4.

Once the value of the footprint shape factor calculation is within the preset range, the noise level is measured. While the noise level can be measured over the entire frequency range, as discussed with regards to the footprint of a tire having an aspect ratio of greater than 60, it has been found that measurements of noise above about 800 hertz (Hz) are the most significant indicators of tire noise emitters which occur due to the configuration of the tire.

With a tire having an aspect ratio of less than about 60, the footprint 21 has a greater curvature at the first and second edges 22 and 24 and straighter leading and trailing edges 26 and 28. The result is that the shoulders of the tire flex more during the rotation of the tire as compared with the shoulders of a tire having an aspect ratio above 60, as shown in FIG. 1.

The method of the present invention for characterizing the potential noise level generated during the rotation of a tire from a tire tread contacting a road surface comprises a number of steps which can be carried out in any conventional method including computer programming. The steps include:

a) determining the location of a leading edge of a footprint of the tire tread which first comes into contact with the road surface when the tire normally loaded and normally inflated rotates with respect to the location of a trailing edge which is the opposite edge of the footprint that last comes into contact with the road surface when the tire rotates;

b) determining the length (L) of the footprint from the leading edge to the trailing edge extending along a centerline (CL) through the footprint, the centerline being disposed halfway between a first lateral edge and a second lateral edge of the footprint of the tire tread;

c) determining the length ($A_1$) of the footprint from the leading edge to the trailing edge in proximity to the first lateral edge of the footprint at a location corresponding to about 80% of the distance ($W_1$), $W_1$ being the lateral distance from the centerline CL to the first lateral edge;

d) determining the length ($A_2$) of the footprint from the leading edge to the trailing edge in proximity to the second lateral edge of the footprint at a location corresponding to about 80% of the distance ($W_2$), $W_2$ being the lateral distance from the centerline (CL) to the second lateral edge;

e) calculating the footprint shape factor (FSF80%) of the tire with an equation $$FSF80\% = \frac{L}{(A_1 + A_2)/2}$$

when the aspect ratio of the tire is above about 60; and f) measuring said noise level of said tire when 0.9<FSF80%<1.6.

Further steps include:

g) reconfiguring the footprint whenever the 0.9>FSF80%>1.6; and h) rerunning steps a) though f).

The same steps are carried out when the aspect ratio is under about 60 except that the the lengths of the footprint from the leading edge to the trailing edge in proximity to both the first and second lateral edges of the footprint are measured at a location corresponding to about 90% of the lateral distance from the centerline (CL) to the first and second lateral edges. Also the noise level of the tire is measured when 0.9<FSF90%<2.0. As with tires having a higher aspect ratio, the tire is reconfigured when FSF90% is outside of the preset range.

In one test example, two tires having the same load and the same inflation pressure but with slightly different footprint shape factors, i.e., one with 1.25 and the other with 1.3, were operated at the same speed of 55 Kph. The sound level of the tire with a footprint shape factor of 1.25 was 66.36 dBA and that of the tire with a footprint shape factor of 1.30 was 66.68 dBA. The fact that the tire with the footprint shape factor of a slightly higher value had a higher noise level shows that footprint shape factors are good indicators of tire noise. It is thought that round shaped footprints with higher numerical FSF values create movement and twisting in the shoulders of the tire which result in high frequency noise emission.

Referring to FIGS. 3, 4 and 5, there is illustrated a graph showing the pass-by noise of two closely matched test tires (Tire A and Tire B) which are primarily dissimilar in their footprint shape. Specifically, the leading and trailing edges of the footprint of Tire A have less curvature than that of the leading and trailing edges of Tire B. The pass-by noise level of Tire A is 67.5 dBA while that of Tire B is 68.7 dBA. These tires were tested at the same load and same inflation pressure at a speed of about 55 kilometers per hour (kph). This data indicates that a tire footprint having more curvature emits a louder coast-by noise than a similar tire which is primarily different in that it has a footprint with less curvature of the leading and trailing edges. The graph suggests that while the total sound level emitted by the tire is a contribution of all frequencies, the sound emitted at frequencies above about 800 Hz is the most effected by change in the curvature of the tread footprint. Therefore, a designer can attribute a degree of the changes in the sound level in the frequency range of above 800 Hz to changes in footprint curvature by monitoring the changes in sound level in dBA.

Referring to FIGS. 6 and 7, there is illustrated the footprints of two smooth test tires of nearly the same construction and both having a low aspect ratio, i.e., Tire C has an aspect ratio of 55 and Tire D has an aspect ratio of 50. When the FSF of the footprints were measured at 80%, the FSF for the Tire C had a value of 1.18 while that for the Tire D was 1.26. Thus, for a difference of 0.08 FSF80%, there was a change of 2 dBA. Using the values for measuring FSF90% for the same test Tires C and D having an aspect ratio of less about 60, the value of FSF90% for Tire C was 1.40 while FSF90% for Tire D was 1.69. In this instance, for a difference of 0.29 FSF90% there was a change of 2 dBA. By measuring a distance of about 90% of the distance from the centerline to the opposite lateral edges of the tire footprint, and then measuring in the shoulder area of the tire, the FSF90% immediately shows if the footprint needs to be redesigned to within the limits of acceptable noise level for the tire when 0.9<FSF90%>2.0. More preferably, the FSF90% limit for measuring the noise level of the tire is when 1.0<FSF90%>1.4.

The effect of increased noise level with a tire having more curvature, as for example the differences between Tires C and D of FIGS. 6 and 7, respectively, lead to the observation that more curvature implies increased pass-by noise.

It is apparent that there has been provided in accordance with this invention a method of characterizing the level of pass-by noise generated by a tire having a specific footprint configuration through analyzing the shape of the tires footprint and taking into account the aspect ratio of the tire while making a calculation that accounts for the aspect ratio of the tire. The method continues by a) measuring the noise level if the solution to the calculation is inside of a predetermined range or b) reconfiguring the footprint if the solution to the calculation is outside of a predetermined range.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

We claim:

1. A method for characterizing the potential noise level generated during the rotation of a tire from a tire tread contacting a road surface, comprising the steps of:

a) determining the location of a leading edge of a footprint of said tire tread which first comes into contact with said road surface when said tire normally loaded and normally inflated rotates with respect to said location of a trailing edge which is the opposite edge of said footprint that last comes into contact with said road surface when said tire rotates;

b) determining the length (L) of said footprint from said leading edge to said trailing edge extending along a centerline (CL) through said footprint, said centerline being disposed halfway between a first lateral edge and a second lateral edge of said footprint of said tire tread;

c) determining the length ($A_1$) of said footprint from said leading edge to said trailing edge in proximity to said first lateral edge of said footprint at a location corresponding to about 80% of the distance ($W_1$), $W_1$ being the lateral distance from said centerline CL to said first lateral edge;

d) determining the length ($A_2$) of said footprint from said leading edge to said trailing edge in proximity to said second lateral edge of said footprint at a location corresponding to about 80% of the distance ($W_2$), $W_2$ being said lateral distance from said centerline CL to said second lateral edge;

e) calculating the footprint shape factor (FSF80%) of said tire with an equation $$FSF80\% = \frac{L}{(A_1 + A_2)/2}$$

when said aspect ratio of said tire is above about 60; and f) measuring said noise level of said tire when 0.9<FSF80%<1.6.

2. Said method of claim 1 including the steps of:

g) reconfiguring said footprint whenever the 0.9>FSF80%>1.6; and h) rerunning steps a) though f).

3. The method of claim 1 wherein the step of measuring said noise level includes measuring above about 800 Hz.

4. A method for estimating the potential noise level generated during the rotation of a tire from a tire tread contacting a road surface, comprising the steps of:

a) determining the location of a leading edge of a footprint of said tire tread which first comes into contact with said road surface when said tire normally loaded and normally inflated rotates with respect to the location of a trailing edge which is the opposite edge of said footprint that last comes into contact with said road surface when said tire rotates;

b) determining the length (L) of said footprint from said leading edge to said trailing edge extending along a centerline (CL) through said footprint, said centerline being disposed halfway between a first lateral edge and a second lateral edge of said footprint of said tire tread;

c) determining the length ($B_1$) of said footprint from said leading edge to said trailing edge in proximity to said first lateral edge of said footprint at a location corresponding to about 90% of the distance ($W_1$), $W_1$ being the lateral distance from said centerline CL to said first lateral edge;

d) determining the length ($B_2$) of said footprint from said leading edge to said trailing edge in proximity to said second lateral edge of said footprint at a location corresponding to about 90% of the distance ($W_2$), $W_2$ being the lateral distance from said centerline CL to said second lateral edge;

e) calculating the footprint shape factor (FSF90%) of said tire with an equation $$FSF90\% = \frac{L}{(B_1 + B_2)/2}$$

when said aspect ratio of said tire is below about 60; and f) measuring said noise level of said tire when 0.9<FSF90%<2.0.

5. The method of claim 4 including the steps of:

g) reconfiguring said footprint whenever said 0.9>FSF90%>2.0, and h) rerunning steps a) though f).

6. The method of claim 4 wherein said step of measuring said noise level includes measuring above about 800 Hz.

* * * * *